US008699506B2

(12) United States Patent
Taniguchi et al.

(10) Patent No.: US 8,699,506 B2
(45) Date of Patent: Apr. 15, 2014

(54) OPTICAL TRANSMISSION APPARATUS AND OPTICAL TRANSMISSION METHOD

(75) Inventors: Miwa Taniguchi, Kawasaki (JP); Yuji Shimada, Kawasaki (JP); Yoshinobu Matsukawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 243 days.

(21) Appl. No.: 13/366,895

(22) Filed: Feb. 6, 2012

(65) Prior Publication Data

US 2012/0257903 A1 Oct. 11, 2012

(30) Foreign Application Priority Data

Apr. 7, 2011 (JP) .................. 2011-085842

(51) Int. Cl.
*H04B 7/212* (2006.01)
(52) U.S. Cl.
USPC ......................................... 370/442

(58) Field of Classification Search
None
See application file for complete search history.

(56) References Cited

PUBLICATIONS

"Interfaces for the Optical Transport Network (OTN)", ITU-T G.709/Y.1331 http://www.itu.int/rec/T-REC-G.709/en, Dec. 2009.

*Primary Examiner* — John Blanton
(74) *Attorney, Agent, or Firm* — Fujitsu Patent Center

(57) ABSTRACT

An optical transmission apparatus includes an extractor that extracts information indicating port allocation to each slot of a reception signal; a comparator that based on the extracted information and for a given slot among the slots, obtains a count of the slots allocated the same port as the given slot and compares the obtained count of slots and an expected value for the given slot; and a memory that stores therein for each slot, an expected value for the count of slots allocated the same port as the slot. The comparator detects a mismatch concerning the given slot, when the obtained count of slots and the expected value for the given slot differ.

9 Claims, 23 Drawing Sheets

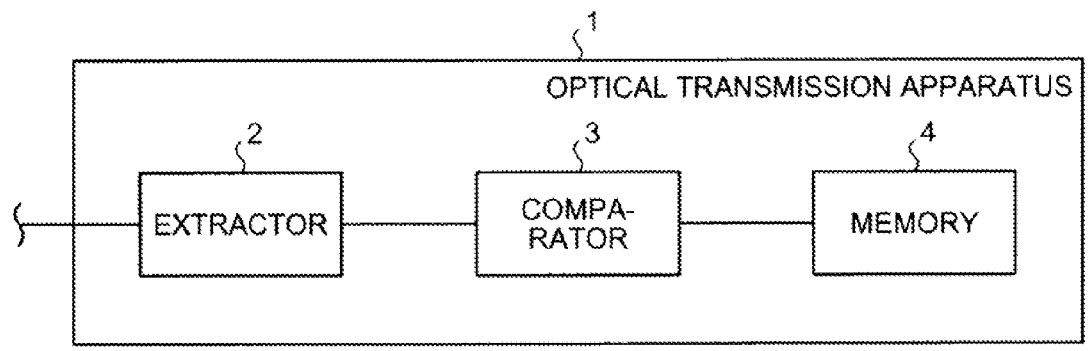
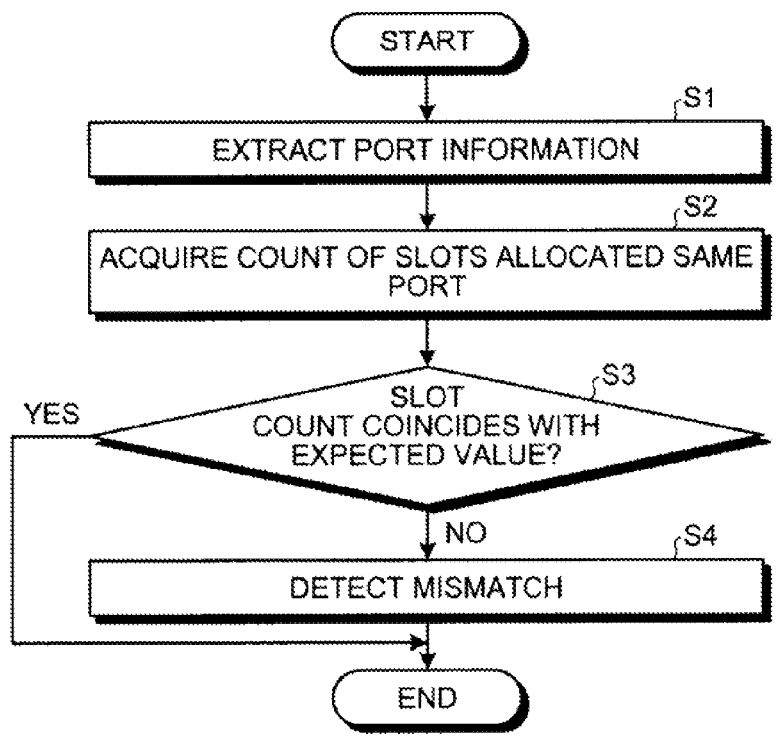

FIG.8

RCV_MSI_Table[MAXTSINFO]

| No | ODTUTYPE | TRIBUTARY PORT NUMBER |
|----|----------|----------------------|
| 0  | ODTU2.ts | 1 |
| 1  | ODTU12   | 1 |
| 2  | ODTU12   | 1 |
| 3  | ODTU2.ts | 3 |
| 4  | ODTU2.ts | 3 |
| 5  | ODTU2.ts | 3 |
| 6  | ODTU2.ts | 3 |
| 7  | ODTU2.ts | 2 |

FIG.9

RCV_TS_List[MAXTSINFO]

| No | TS1 SEARCH | TS2 SEARCH | TS3 SEARCH | TS4 SEARCH | TS5 SEARCH | TS6 SEARCH | TS7 SEARCH | TS8 SEARCH |
|---|---|---|---|---|---|---|---|---|
| 0 | 1 (TS1) | null | null | 4 (TS4) | (A) skip | (A) skip | (A) skip | 8 (TS8) |
| 1 | - |  |  | 5 (TS5) |  |  |  |  |
| 2 | - |  |  | 6 (TS6) |  |  |  |  |
| 3 | - |  |  | 7 (TS7) |  |  |  |  |
| 4 | - |  |  |  |  |  |  |  |
| 5 | - |  |  |  |  |  |  |  |
| 6 | - |  |  |  |  |  |  |  |
| 7 | - |  |  |  |  |  |  |  |

FIG.10

RCV_Concate_Table[MAXTSINFO]

| TS_Number | CONCATE INFORMATION |
|---|---|
| 1 | 1concate |
| 2 | null |
| 3 | null |
| 4 | 4 concate |
| 5 | 4 concate |
| 6 | 4 concate |
| 7 | 4 concate |
| 8 | 1 concate |

FIG.11

EXP_MSI_Table[MAXTSINFO]

| No | ODTUTYPE | TRIBUTARY PORT NUMBER |
|---|---|---|
| 0 | ODTU2.ts | 1 |
| 1 | ODTU12 | 1 |
| 2 | ODTU12 | 1 |
| 3 | ODTU2.ts | 3 |
| 4 | ODTU2.ts | 3 |
| 5 | unallocate | 1 |
| 6 | unallocate | 1 |
| 7 | ODTU2.ts | 2 |

FIG.12

EXP_TS_List[MAXTSINFO]

| No | TS1 SEARCH | TS2 SEARCH | TS3 SEARCH | TS4 SEARCH | TS5 SEARCH | TS6 SEARCH | TS7 SEARCH | TS8 SEARCH |
|---|---|---|---|---|---|---|---|---|
| 0 | 1 (TS1) | null | null | 4 (TS4) | (A) skip | null | null | 8 (TS8) |
| 1 | - | | | 5 (TS5) | | | | |
| 2 | - | | | | | | | |
| 3 | - | | | | | | | |
| 4 | - | | | | | | | |
| 5 | - | | | | | | | |
| 6 | - | | | | | | | |
| 7 | - | | | | | | | |

FIG.13

EXP_Concate_Table[MAXTSINFO]

| TS_Number | CONCATE INFORMATION |
|---|---|
| 1 | 1concate |
| 2 | null |
| 3 | null |
| 4 | 2 concate |
| 5 | 2 concate |
| 6 | null |
| 7 | null |
| 8 | 1 concate |

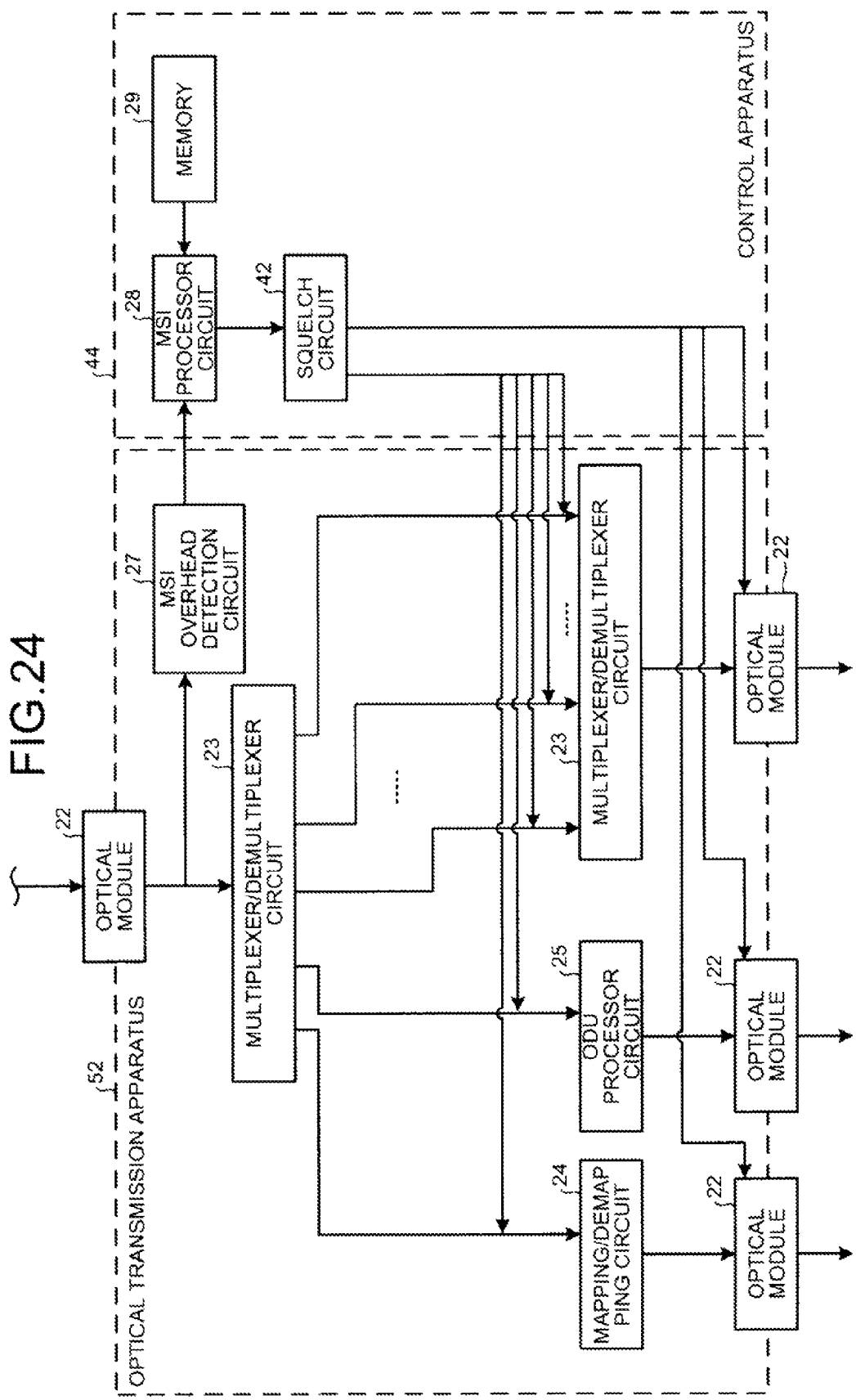

FIG.25

| | | | |
|---|---|---|---|
| PSI [2] | 10: ODTU2.ts | 00 0000: TRIBUTARY PORT 1 | TS1 |
| PSI [3] | 00: ODTU12 | 00 0000: TRIBUTARY PORT 1 | TS2 |
| PSI [4] | 00: ODTU12 | 00 0000: TRIBUTARY PORT 1 | TS3 |
| PSI [5] | 10: ODTU2.ts | 00 0010: TRIBUTARY PORT 3 | TS4 |
| PSI [6] | 10: ODTU2.ts | 00 0010: TRIBUTARY PORT 3 | TS5 |
| PSI [7] | 10: ODTU2.ts | 00 0010: TRIBUTARY PORT 3 | TS6 |
| PSI [8] | 10: ODTU2.ts | 00 0010: TRIBUTARY PORT 3 | TS7 |
| PSI [9] | 10: ODTU2.ts | 00 0001: TRIBUTARY PORT 2 | TS8 |

FIG.26

| | | | |
|---|---|---|---|
| PSI [2] | 10: ODTU2.ts | 00 0000: TRIBUTARY PORT 1 | TS1 |
| PSI [3] | 00: ODTU12 | 00 0000: TRIBUTARY PORT 1 | TS2 |
| PSI [4] | 00: ODTU12 | 00 0000: TRIBUTARY PORT 1 | TS3 |
| PSI [5] | 10: ODTU2.ts | 00 0010: TRIBUTARY PORT 3 | TS4 |
| PSI [6] | 10: ODTU2.ts | 00 0010: TRIBUTARY PORT 3 | TS5 |
| PSI [7] | 11: NOT USED | 00 0000: TRIBUTARY PORT 1 | TS6 |
| PSI [8] | 11: NOT USED | 00 0000: TRIBUTARY PORT 1 | TS7 |
| PSI [9] | 10: ODTU2.ts | 00 0001: TRIBUTARY PORT 2 | TS8 |

OPTICAL TRANSMISSION APPARATUS AND OPTICAL TRANSMISSION METHOD

CROSS REFERENCE TO RELATED APPLICATIONS

This application is based upon and claims the benefit of priority of the prior Japanese Patent Application No. 2011-085842, filed on Apr. 7, 2011, the entire contents of which are incorporated herein by reference.

FIELD

The embodiments discussed herein are related to an optical transmission apparatus and an optical transmission method.

BACKGROUND

Conventionally, optical transmission systems multiplex client signals, divide the multiplexed signals among slots on the optical signal transmission side and transmit the signals; and on the optical signal receiving side, restore the received signals to the original client signals and transmit the signals to the respective clients. For example, an optical transport network (OTN) is one optical transmission technological specification. Standardization of OTNs is in progress by the International Telecommunication Union-Telecommunication sector (ITU-T) and the Institute of Electrical and Electronic Engineers (IEEE).

In an OTN, a large variety of client signals can be accommodated by an optical channel data unit (ODU) by a mapping method called Generic Mapping Procedure (GMP). An OTN frame accommodating various types of client signals is multiplexed at a higher layer and transmitted. In this case, the higher layer band is divided into multiple bands. For example, if a higher layer is an optical channel transport unit 2 (OTU2), a 10-G bit/second band is divided into eight 1.25-G bit/second bands. In this case, eight tributary slots (TS) can be freely allocated to each OTN frame (ODTU2.ts). This allocation is indicated in an overhead called multiplex structure identifier (MSI), which indicates the divided band structure.

For example, in an optical channel payload unit 4 (OPU4), 80 payload structure identifiers (PSIs) in the MSI are provided. Each PSI has a length of 1 byte (8 bits), where the highest bit indicates "in-use (Allocated)" or "available (Unallocated)" and the lower 7 bits indicate 1 to 80 tributary port numbers.

For example, in an optical channel payload unit 3 (OPU3), 32 PSIs are provided in the MSI. Each PSI has a length of 1 byte (8 bits), where the upper 2 bits indicate the "type of optical channel data tributary unit (ODTU)" or "available" and the lower 6 bits indicate 1 to 32 tributary port numbers.

For example, in an optical channel payload unit 2 (OPU2), 8 PSIs are provided in the MSI. Each PSI has a length of 1 byte (8 bits), where the upper 2 bits indicate the "type of ODTU", "reserved", or "available" and the lower 6 bits indicate 1 to 8 tributary port numbers. Under ITU-T standards, a tributary port number is a logic port number and consequently, there are no restrictions concerning which tributary slot is allocated which tributary port number.

Further, in an OTN, if the MSI value set on the transmission side and on the reception side differ, detection as mismatch is prescribed. According to ITU-T, at the reception-side apparatus, the received MSI value (i.e., the MSI value set on the transmission side) and the expected MSI value (i.e., the MSI value set on the reception side) are compared according to tributary slot, and if the values differ, the detection of mismatch alarm according to tributary slot is defined. For reference, see ITU-T G.709/Y.1331 (12/2009), "Interfaces for the Optical Transport Network(OTN)", for example.

Nonetheless, presently, in the prescribed ITU-T standard, the handling of concatenated signals of logic tributary ports is not sufficiently considered and consequently, there are cases when the detection of MSI mismatches prescribed by standards for the detection of mismatching communicated MSIs cannot be detected. In other words, in an OTN, even if the concatenated tributary slot count for the transmission-side MSI and for the reception-side MSI differ, there are cases when the MSI mismatch alarm cannot be detected.

FIG. 25 is a table of one example of MSI values received at the reception-side. FIG. 26 is a table of one example of MSI values expected at the reception-side. For example, in the example depicted in FIG. 25, the transmission-side is set such that a 4-Gbps fiber channel (4GFC) is mapped to ODTU2.4 and allocated to tributary slots 4 to 7. In the example depicted in FIG. 26, the transmission-side is set such that a 2-Gbps fiber channel (2GFC) is mapped to ODTU2.2 and allocated to tributary slots 4 and 5.

In the examples depicted in FIG. 25 and FIG. 26, among the received MSI values and the expected MSI values, the setting of tributary slots 4 and 5 coincide and therefore, the reception-side apparatus does not detect the MSI mismatch alarm. Further, among the expected MSI values, tributary slots 6 and 7 are set as available and therefore, even though settings for the received MSI values and the expected MSI values differ, the reception-side apparatus does not detect the MSI mismatch alarm. In this case, concerning tributary slots 6 and 7, the reception-side apparatus detects a loss of frame (LOF) alarm, which is unsuitable.

On the other hand, a synchronous optical network (SONET) uses concatenated information in the overhead. In an OTN, it is conceivable for concatenated information similar to SONET to be stored to available overhead. However, in OPU4, 80 units of concatenated information have to be defined for the tributary slots, which makes processing complicated and consequently, is unrealistic.

SUMMARY

According to an aspect of an embodiment, an optical transmission apparatus includes an extractor that extracts information indicating port allocation to each slot of a reception signal; a comparator that based on the extracted information and for a given slot among the slots, obtains a count of the slots allocated the same port as the given slot and compares the obtained count of slots and an expected value for the given slot; and a memory that stores therein for each slot, an expected value for the count of slots allocated the same port as the slot. The comparator detects a mismatch concerning the given slot, when the obtained count of slots and the expected value for the given slot differ.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a block diagram of an optical transmission apparatus according to a first embodiment.

FIG. 2 is a flowchart of an optical transmission method according to the first embodiment.

FIG. 8 is a chart depicting one example of received MSI values.

FIG. 9 is a chart of depicting one example of a tributary slot list of received MSIs.

FIG. 10 is a chart depicting one example of a concatenation table of received MSIs.

FIG. 11 is a chart depicting one example of expected values of MSIs.

FIG. 12 is a chart depicting one example of a tributary slot list of expected values of MSIs.

FIG. 13 is a chart depicting one example of a concatenation table of expected values of MSIs.

FIG. 24 is a block diagram of a first modification example of the optical transmission apparatus according to the third embodiment.

FIG. 25 is a table of one example of MSI values received at the reception-side.

FIG. 26 is a table of one example of MSI values expected at the reception-side.

DESCRIPTION OF EMBODIMENTS

Figure 3:
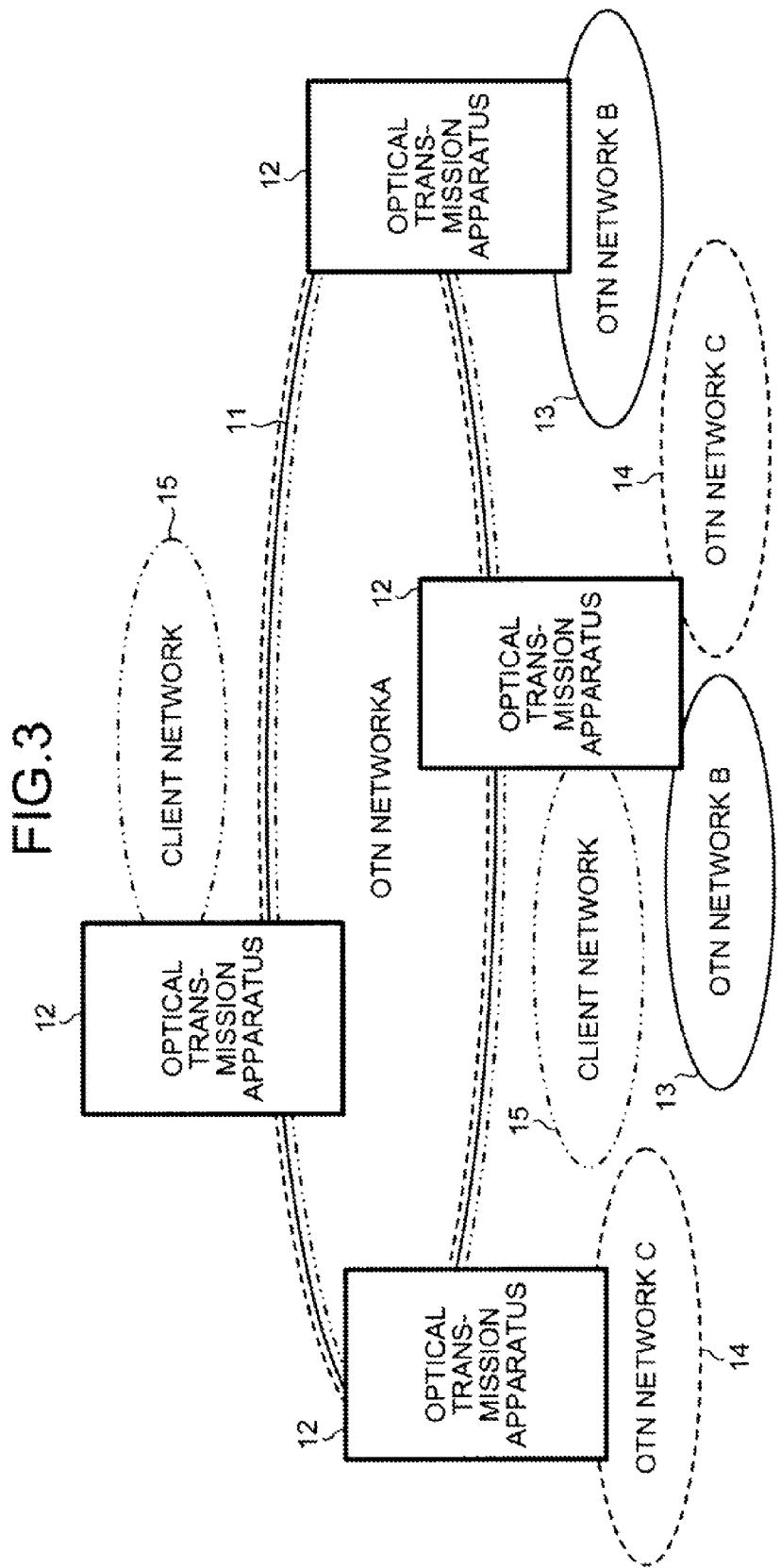
FIG. 3 is a block diagram of one example of an OTN system according to a second embodiment.

Preferred embodiments of the present invention will be explained with reference to the accompanying drawings. An optical transmission apparatus and an optical transmission method obtains for each reception signal slot, a concatenation count of slots allocated the same port, and by comparing the concatenation count with an expected value, detects by reception-side processes alone, an errant setting in which the slot concatenation count on the transmission side and the slot concatenation count on the reception side differ. In the description of each of the embodiments below, identical components are given the same reference numeral and redundant description is omitted.

First Embodiment

Description of Optical Transmission Apparatus

FIG. 1 is a block diagram of an optical transmission apparatus according to a first embodiment. As depicted in FIG. 1, an optical transmission apparatus 1 includes an extractor 2, a comparator 3, and a memory 4. The extractor 2 is connected to a non-depicted network to which the optical transmission apparatus 1 is connected. The comparator 3 is connected to the extractor 2. The memory 4 is connected to the comparator 3. For example, the comparator 3 may be implemented using a processor, a field programmable gate array (FPGA), or a dedicated LSI.

The extractor 2 extracts information indicating the port allocated to each reception signal slot. Based on the port information extracted by the extractor 2, the comparator 3 obtains for each slot, a count of the slots allocated the same port.

The comparator 3 compares the count of slots allocated the same port and an expected value. The memory 4 stores therein, according to slot, the expected value for the count of slots allocated the same port. Each expected value, for example, may be set by a network manager. The comparator 3 performs the comparison for each slot and detects a mismatch when the count of slots allocated the same port and the expected value differ. The comparator 3 may perform comparison for all of the slots, or when the count for a slot and the expected value coincide, the comparator 3 may omit comparison for a slot allocated the same port as the compared slot.

Description of Optical Transmission Method

FIG. 2 is a flowchart of an optical transmission method according to the first embodiment. As depicted in FIG. 2, a reception-side optical transmission apparatus receives a signal from a network and begins a process. First, the extractor 2 extracts information indicating the port allocated to each of the reception signal slots (step S1). Next, based on the port information extracted by the extractor 2, the comparator 3 obtains, for each slot, a count of the slots allocated the same port (step S2). The obtained slot count represents a slot concatenation count.

Subsequently, the comparator 3 reads from the memory 4, the value expected for the count of slots allocated the same port, compares the obtained slot count and the expected value, and determines whether the slot count and the expected value coincide (step S3). For slots that coincide with the expected value (step S3: YES), the comparator 3 ends processing without doing anything, while for slots that do not coincide with the expected value (step S3: NO), the comparator 3 detects a mismatch (step S4), and ends processing.

According to the first embodiment, at the reception side, whether a slot concatenation count in a reception signal coincides with an expected value can be determined. Therefore, by reception-side processes along, an errant setting where the slot concatenation count on the transmission side (slot concatenation count in a reception signal) and on the reception side (expected value) differ can be detected.

Second Embodiment

A second embodiment is an example in which the optical transmission apparatus and the optical transmission method according to the first embodiment are applied to an OTN. The optical transmission apparatus and the optical transmission method according to the first embodiment can be applied to a network other than an OTN.

Description of OTN System

FIG. 3 is a block diagram of one example of an OTN system according to the second embodiment. As depicted in FIG. 3, in the OTN system, one or more of the optical transmission apparatuses 12 is connected to OTN network A_11. Each of the optical transmission apparatuses 12 is connected to other OTN networks, such as OTN network B_13 and OTN network C_14 and may be further connected to a client network 15 such as a SONET, Ethernet (registered trade name), and a fiber channel network. The OTN network B_13, the OTN network C_14, and the client network 15 can mutually transfer signals by way of the optical transmission apparatus 12 and the OTN network A_11.

Description of Optical Transmission Apparatus

Figure 4:
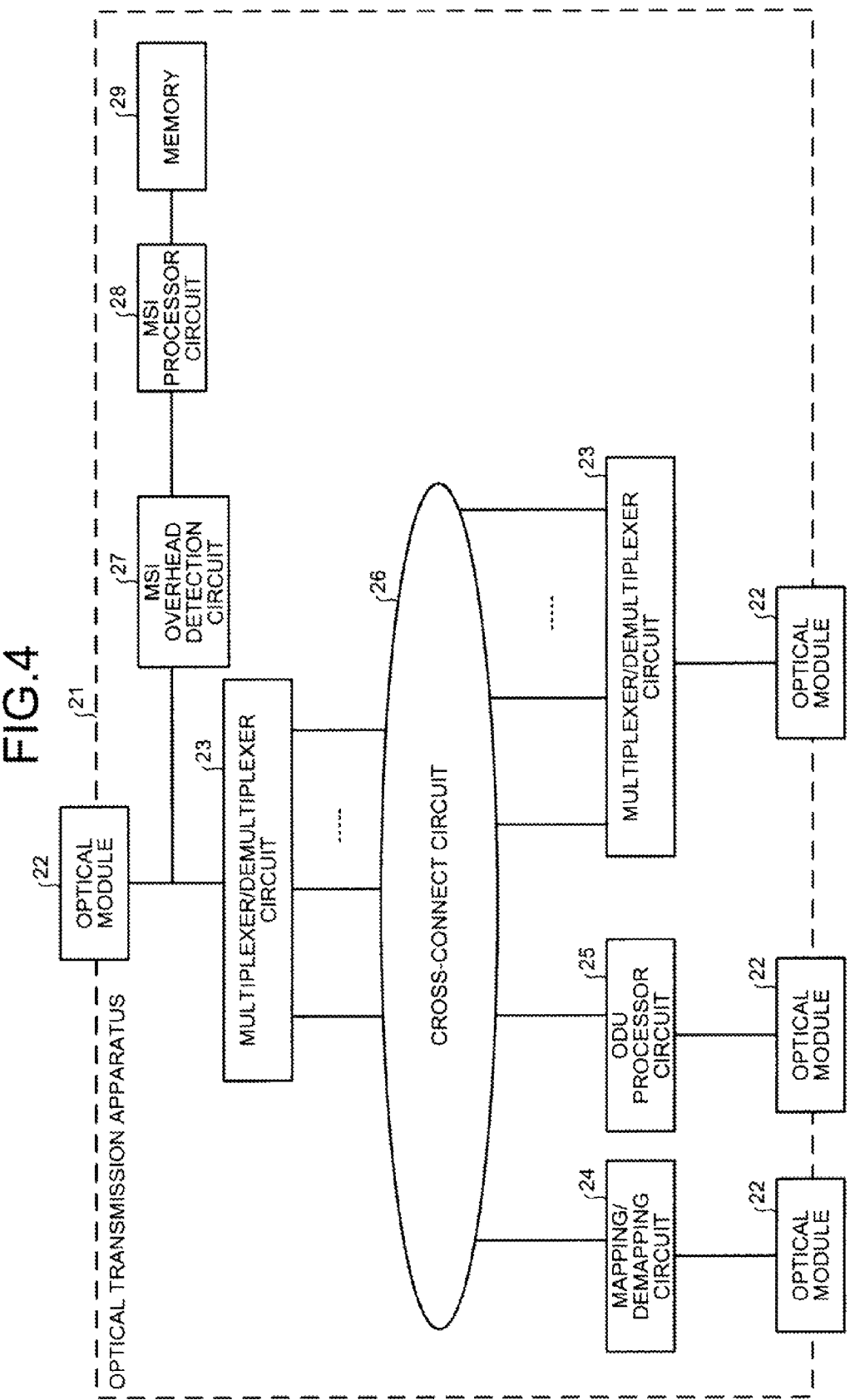
FIG. 4 is block diagram of the optical transmission apparatus according to the second embodiment.
Figure 5:
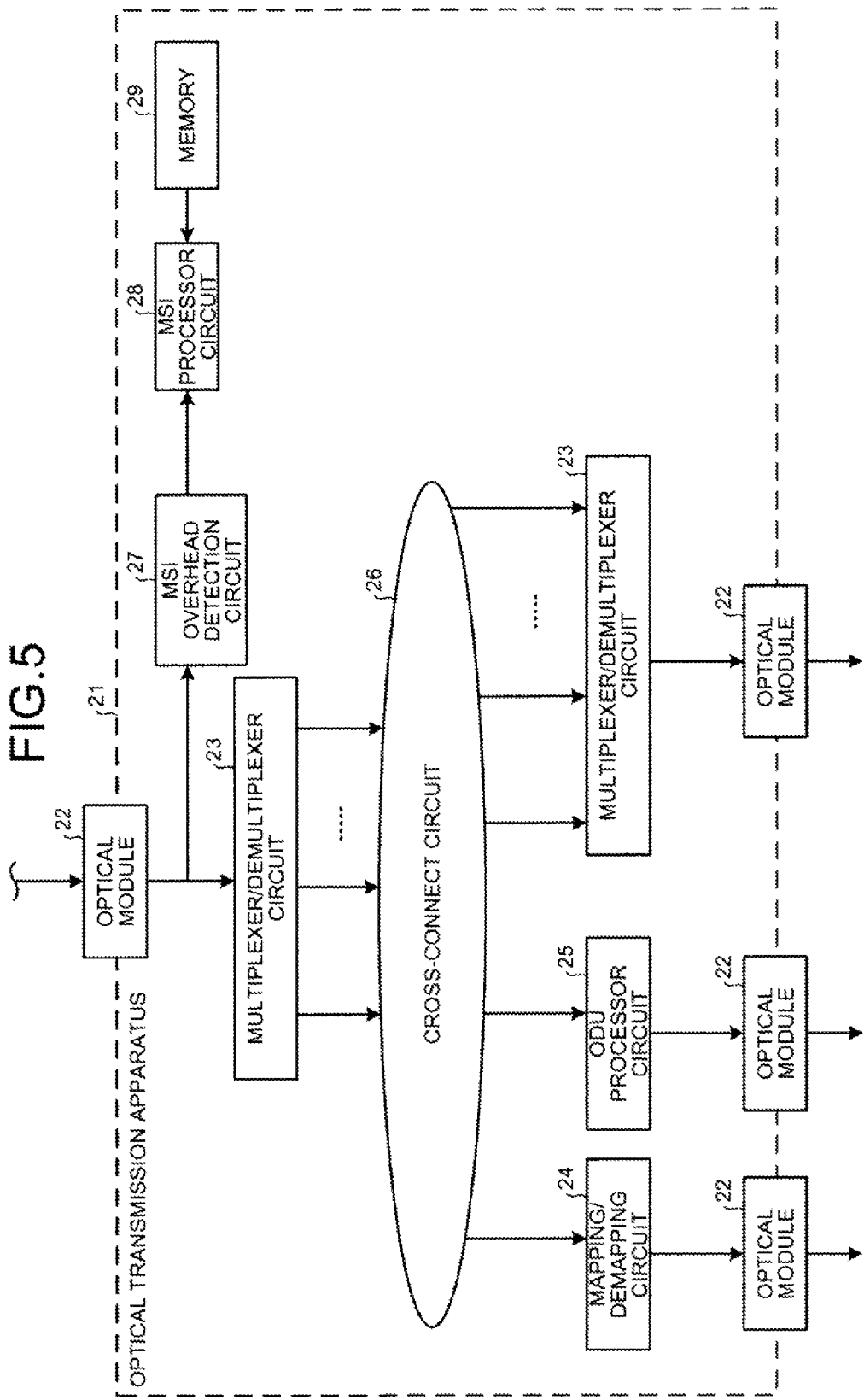
FIG. 5 is a block diagram of the signal flow of the optical transmission apparatus according to the second embodiment.

FIG. 4 is block diagram of the optical transmission apparatus according to the second embodiment. FIG. 5 is a block diagram of the signal flow of the optical transmission apparatus according to the second embodiment. As depicted in FIG. 4 and FIG. 5, an optical transmission apparatus 21 may include as an output unit, for example, multiple optical modules 22, and 1 or more multiplexers/demultiplexers 23.

The optical module 22 is connected to networks, such as the OTN network A_11, the OTN network B_13, the OTN network C_14, and the client network 15. The optical module 22 converts optical signals received from the networks, into electrical signals and forwards the electrical signals to internal circuits of the optical transmission apparatus 21. The optical module 22 converts electrical signals forwarded to the internal circuits of the optical transmission apparatus 21, into optical signals and outputs the optical signals to the networks.

The multiplexer/demultiplexer 23 is connected to any one of the optical modules 22 connected to the OTN network. The multiplexer/demultiplexer 23 multiplexes LO-ODU frames into HO-ODU/OUT frames. The multiplexer/demultiplexer 23 further demultiplexes HO-ODU/OTUs into LO-ODU frames.

Here, a LO-ODU frame (low order ODU frame) is an ODU frame formed by mapping a client signal to a lower layer OPU that corresponds to the client signal and further mapping the client signal to a lower layer ODU that corresponds to the client signal. The client signal defined by ITU-T G.709 may be, for example, an SDH/SONET, Ethernet (registered trade name), fiber channel, or other signal type. The HO-ODU frame (high order ODU frame) is an ODU frame formed by mapping an optical channel data tributary unit group (ODTUG) signal formed by multiplexed LO-ODU signals, to an upper layer OPU(HO-OPU) which concatenates the ODTUG signal, and by further mapping the ODTUG signal to an upper layer ODU that corresponds to the ODTUG signal.

Further, the optical transmission apparatus 21 may include 1 or more mapping/demapping circuits 24. The mapping/demapping circuit 24 is connected to any one of the optical modules 22 connected to a client network. The mapping/demapping circuit 24 maps a client signal to an ODU frame, such as an ODUk frame or an ODUflex frame. The mapping/demapping circuit 24 further demaps an ODU frame into a client signal.

The optical transmission apparatus 21 may include 1 or more ODU processor circuits 25. The ODU processor circuit 25 is connected to any one of the optical modules 22 connected to an OTN network. The ODU processor circuit 25 processes the Section Monitoring (SM) layer/FEC portion of an OTU frame and converts the OTU frame to an ODU. The optical transmission apparatus 21 may omit any among the multiplexers/demultiplexer 23, the mapping/demapping circuit 24, and the ODU processor circuit 25.

Further, the optical transmission apparatus 21 may include, for example, a cross connect circuit 26 as a cross connect. The cross connect circuit 26, for example, is connected to the multiplexers/demultiplexer 23, the mapping/demapping circuit 24, and the ODU processor circuit 25. The cross connect circuit 26 implements a cross connect function of the ODU layer, and distributes ODU frames to output destinations.

Further, the optical transmission apparatus 21 includes, for example, an MSI overhead detection circuit 27 as the extractor, an MSI processor circuit 28 as the comparator 3, and a memory 29.

The MSI overhead detection circuit 27 is connected to the optical module 22, which is connected to the OTN network A_11. The MSI overhead detection circuit 27 detects MSI overhead information of HO-ODUs input from the network.

The MSI processor circuit 28 is connected to the MSI overhead detection circuit 27. The MSI processor circuit 28, based on the MSI overhead information detected for each tributary slot by the MSI overhead detection circuit 27, obtains a concatenation count of tributary slots allocated the same tributary port. For each tributary slot, the MSI processor circuit 28 compares the obtained concatenation count of tributary slots and an expected value. The MSI processor circuit 28 detects an MSI mismatch alarm, based on the comparison result.

For each tributary slot, the memory 29 stores a value expected for the concatenation count of the tributary slot. Each circuit 23 to 28 of the optical transmission apparatus 21 may be configured of hardware such as an application specific integrated circuit (ASIC) and field programmable gate array (FPGA).

Description of Optical Transmission Method

A concatenation table of received MSIs and a concatenation table of expected values of the concatenation counts of the tributary slot are generated by the same procedure. Here, the procedure will be described concerning a concatenation table of received MSIs.

(1) Generation Procedure of Concatenation Table of Received MSIs

Figure 6:
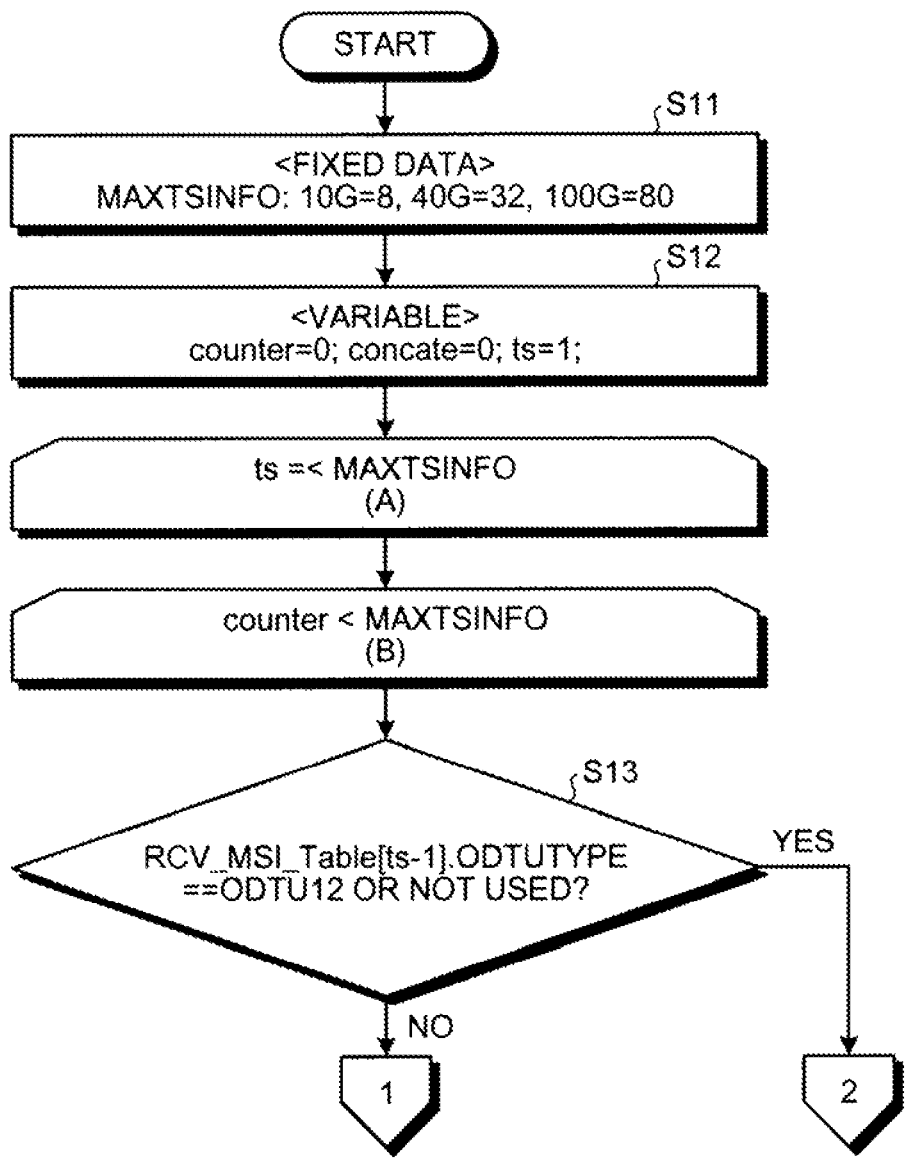
FIG. 6 and FIG. 7 are flowcharts of a concatenation table generation procedure of the optical transmission method according to the second embodiment.
Figure 7:
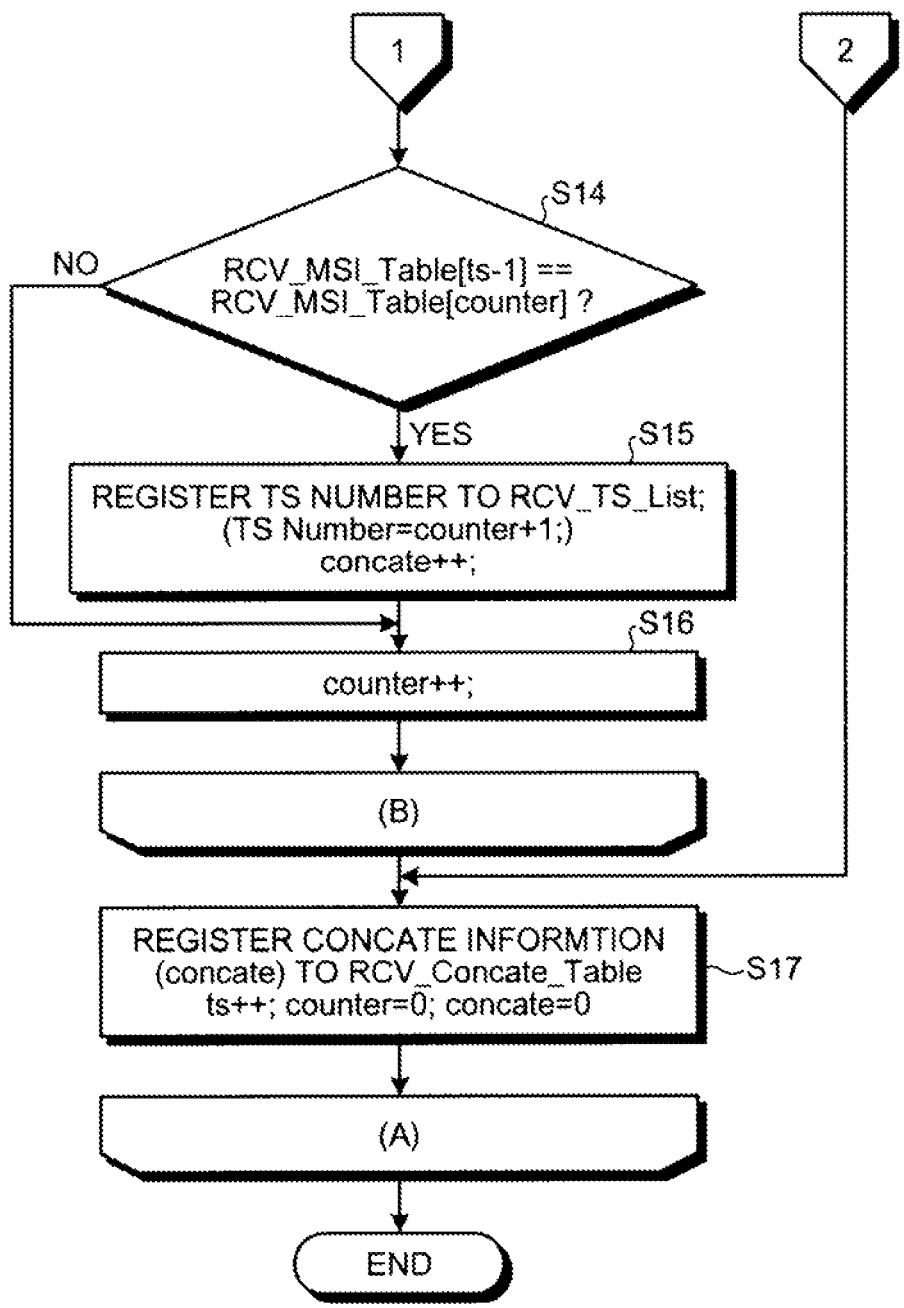

FIG. 6 and FIG. 7 are flowcharts of a concatenation table generation procedure of the optical transmission method according to the second embodiment. FIG. 8 is a chart depicting one example of received MSI values. FIG. 9 is a chart of depicting one example of a tributary slot list of received MSIs. FIG. 10 is a chart depicting one example of a concatenation table of received MSIs.

The concatenation table can be generated by obtaining for each tributary slot, a concatenation count of the tributary slots allocated the same tributary port. The optical transmission apparatus 21 has MAXTSINFO information as fixed data. MAXTSINFO information may be, for example, stored to memory.

The value of MAXTSINFO is 8, 32, and 80 when the optical transmission apparatus 21 is a 10-Gbps apparatus, a 40-Gbps apparatus, and a 100-Gbps apparatus, respectively. Although not particularly limited hereto, a case where the optical transmission apparatus 21 is a 10-Gbps apparatus, the value of MAXTSINFO is 8, and the received MSI bytes are those in the example depicted in FIG. 8 will be described.

Further, the optical transmission apparatus 21 uses counter, concate, and ts as variables. The respective values of counter, concate, and ts may be, for example, updated by a counter.

When generation of a concatenation table begins, the MSI overhead detection circuit 27 of the optical transmission apparatus 21 detects the MSI bytes of the received signal and stores the detected MSI bytes to an RCV_MSI_Table (refer to FIG. 8). As depicted in FIG. 6, the MSI processor circuit 28 sets, for example, 8 as MAXTSINFO (step S11).

Further, the MSI processor circuit 28 initializes the values of counter, concate, and ts (step S12). The initial value of counter is, for example, 0. The initial value of concate is, for example, 0. The initial value of ts is, for example, 1.

Search Concerning (1-1)TS1

Since ts=1, the MSI processor circuit 28 searches for the tributary slot concatenation count for tributary slot (TS1), which has a tributary slot number of 1.

Here, No. [ts−1] in the RCV_MSI_Table (refer to FIG. 8) is the ODTUTYPE of No. 0 and, for example, is ODTU2.ts (step S13: NO). Further, since [ts−1] and the value of counter are both 0, No. [ts−1] in the RCV_MSI_Table (refer to FIG. 8) and No. [counter] are the same (step S14: YES).

Therefore, the MSI processor circuit 28 registers in the TS1 search column in the RCV_TS_List (tributary slot list, refer to FIG. 9), as the tributary slot number (TS Number), the value of counter+1, herein 1, i.e., TS1. Subsequently, the MSI processor circuit 28 increments the value of concate to 1 (step S15). The MSI processor circuit 28 increments the value of counter to 1 (step S16).

In returning to step S13, since step S13 is "NO", the flow proceeds to step S14. At step S14, in the RCV_MSI_Table (refer to FIG. 8), the ODTUTYPE of No. [ts−1] (herein, No. 0) and of No. [counter] (herein, No. 1) differ (step S14: NO). Therefore, the MSI processor circuit 28 skips step S15, increments the value of counter to 2 (step S16), and returns to step S13.

In the example depicted in FIG. 8, instances when the value of counter is 2 is the same as when counter=1. However, instances when the value of counter is 3 to 7, ODTUTYPE thereof and for No. 0 in the RCV_MSI_Table (refer to FIG. 8) are the same, but the tributary port numbers differ. At step S16, the value of counter is incremented to 8, i.e., upon becoming identical to the value of MAXTSINFO, the MSI processor circuit 28 ends the loop processes from step S13 to step S16 (loop processing indicated by (B) in FIG. 6 and FIG. 7).

In the RCV_Concate_Table (concatenation table of received MSIs, refer to FIG. 10), the MSI processor circuit 28 registers 1 for the value of concate, as concate information (concatenation information) for which the tributary slot number (TS number) is 1. The MSI processor circuit 28 increments the value of ts to 2, and returns the value of counter and the value of concate to 0 (step S17).

Search Concerning (1-2)TS2

Since ts=2, the MSI processor circuit 28 searches for the tributary slot concatenation count for tributary slot (TS2), which has a tributary slot number of 2.

Here, No. [ts−1] in the RCV_MSI_Table (refer to FIG. 8) is the ODTUTYPE of No. 1 and, for example, is ODTU12 (step S13: YES). Therefore, the MSI processor circuit 28 skips the loop processes at step S14 to step S16 and step S13 to step S16, and in the RCV_Concate_Table (refer to FIG. 10), registers herein 0, i.e., null to the value of concate, as the concate information (concatenation information) for which the tributary slot number (TS number) is 2. The MSI processor circuit 28 increments the value of ts to 3, and returns the value of counter and the value of concate to 0 (step S17).

Search Concerning (1-3)TS3

Since ts=3, the MSI processor circuit 28 searches for the tributary slot concatenation count for the tributary slot (TS3), which has a tributary slot number of 3.

Here, No. [ts-1] in the RCV_MSI_Table (refer to FIG. 8) is the ODTUTYPE of No. 2 and, for example, is ODTU12. Consequently, this search is the same as the search concerning (1-2)TS2 above. The value of ts is 4, and the value of counter and the value of concate return to 0.

Search Concerning (1-4)TS4

Since ts=4, the MSI processor circuit 28 searches for tributary slot concatenation count for the tributary slot (TS3), which has a tributary slot number of 4.

Here, No. [ts-1] in the RCV_MSI_Table (refer to FIG. 8) is the ODTUTYPE No. and is, for example, ODTU2.ts (step S13: NO). Further, in the RCV_MSI_Table (refer to FIG. 8), the tributary port number for No. 3 and No. [counter] (herein, No. 0) differ (step S14: NO). Therefore, the MSI processor circuit 28 skips step S15, increments the value of counter to 1 (step S16), and returns to step S13.

While the loop processes at step S13 to step S16 are repeated, when the value of counter becomes ts−1 (herein, 3), in the RCV_MSI_Table (refer to FIG. 8), No. [ts-1] and No. [counter] become identical (step S14: YES). Therefore, the MSI processor circuit 28 registers into the TS4 search column in the RCV_TS_List (refer to FIG. 9), the value of counter+1 (herein 4, i.e., TS4) as the tributary slot number (TS Number). The MSI processor circuit 28 increments the value of concate to 1 (step S15). Next, the MSI processor circuit 28 increments the value of counter to 4 (step S16).

In returning to step S13, since step S13 is "NO", the flow proceeds to step S14. At step S14, in the RCV_MSI_Table (refer to FIG. 8), No. [counter] (herein, No. 4) is identical to No. 3. Therefore, the MSI processor circuit 28 registers to the TS4 search column in the RCV_TS_List (refer to FIG. 9), the value of counter+1 (herein, 6, i.e., TS5) as the tributary slot number (TS Number). The MSI processor circuit 28 increments the value of concate to 2 (step S15). The MSI processor circuit 28 further increments the value of counter to 5 (step S16).

In the example depicted in FIG. 8, at step S13, instances when the value of counter is respectively 5 and 6, are identical to that when counter=4. Therefore, in the TS4 search column of the RCV_TS_List (refer to FIG. 9), 6 and 7, i.e., TS6 and TS7 are registered as the tributary slot number (TS Number). The concate value is incremented twice to 4 (step S15). Further, the value of counter is incremented twice to 7 (step S16).

In returning to step S13, since step S13 is "NO", the flow returns to step S14. At step S14, in the RCV_MSI_Table (refer to FIG. 8), the tributary port numbers for No. 3 and No. [counter] (herein, No. 7) differ (step S14: NO). Therefore, the MSI processor circuit 28 skips step S15 and increments the value of counter to 8 (step S16). Since the value of counter and the value of MAXTSINFO have become identical, the MSI processor circuit 28 ends the loop processes at step S13 to step S16.

The MSI processor circuit 28 registers in the RCV_Concate_Table (refer to FIG. 10), the value of concate (herein, 4) as concate information (concatenation information) for which the tributary slot number (TS Number) is 4, 5, 6, and 7.

The MSI processor circuit 28 increments the value of ts to 5, and returns the value of counter and the value of concate to 0 (step S17).

Search Concerning (1-5)TS5, TS6, and TS7

Configuration may be such that the MSI processor circuit 28 performs the loop processes at step S13 to step S17 (loop processing indicated by (A) in FIG. 6 and FIG. 7) for only TSs for which the concate information field is empty in the RCV_Concate_Table (refer to FIG. 10). In this case, the MSI processor circuit 28 regards searches concerning TS5, TS6, and TS7 as searches to be skipped. Further, the MSI processor circuit 28 may constantly perform the loop processes at step S13 to step S17, irrespective of the RCV_Concate_Table (refer to FIG. 10).

Search Concerning (1-6)TS8

The value of ts is incremented 3 times to 8. The value of counter and the value of concate are returned to 0. The MSI processor circuit 28 searches for the tributary slot concatenation count for tributary slot (TS8), which has a tributary slot number of 8.

Here, No. [ts−1] in the RCV_MSI_Table (refer to FIG. 8) is the ODTUTYPE of No. 7 and, for example, is ODTU2.ts (step S13: NO). Further, in the RCV_MSI_Table (refer to FIG. 8), the tributary port number of No. 7 and No. [counter] (herein, No. 0) differ (step S14: NO). Therefore, the MSI processor circuit 28 skips step S15, increments the value of counter to 1 (step S16), and returns to step S13.

While the loop processes at step S13 to step S16 are repeated, when the value of counter becomes ts-1 (herein, 7), in the RCV_MSI_Table (refer to FIG. 8), No. [ts−1] and No. [counter] become identical (step S14: YES). Therefore, the MSI processor circuit 28 registers into the TS8 search column in the RCV_TS_List (refer to FIG. 9), the value counter+1 (herein, 8, i.e., TS 8) as the tributary slot number (TS Number). The MSI processor circuit 28 increments the value of concate to 1 (step S15). The MSI processor circuit 28 further increments the value of counter to 8 (step S16). Since the value of counter has become identical to the value of MAXTSINFO, the MSI processor circuit 28 ends the loop processes from step S13 to step S16.

The MSI processor circuit 28 registers into the RCV_Concate_Table (refer to FIG. 10), the value of concate (herein, 1) as concate information (concatenation information) for which the tributary slot number (TS Number) is 8. The MSI processor circuit 28 increments the value of ts to 9, and returns the value of counter and the value of concate to 0 (step S17). Since the value of ts is greater than the value of MAXTSINFO, the MSI processor circuit 28 ends the loop processes from step S13 to step S17. The MSI processor circuit 28 completes generation of the concatenation table of received MSIs.

(2) Procedure for Generating Concatenation Table of Expected Values (Expected Values of MSIs) for Tributary Slot Concatenation Counts FIG. 11 is a chart depicting one example of expected values of MSIs. FIG. 12 is a chart depicting one example of a tributary slot list of expected values of MSIs. FIG. 13 is a chart depicting one example of a concatenation table of expected values of MSIs. A case will be described in which the expected values of MSIs are those in the example depicted in FIG. 11. For example, the memory 29 of the optical transmission apparatus 21 may store expected values similar to those depicted in FIG. 12.

The generation procedure of the concatenation table is identical to the above (1) generation procedure of concatenation table of received MSIs. In the description of (1) generation procedure of the MSI concatenation table, the RCV_M-SI_Table, the RCV_TS_List, and the RCV_Concate_Table may be respectively read as EXP_MSI_Table, EXP_TS_List, and EXP_Concate_Table. Herein, RCV_ indicates "received" and EXP_ indicates "expected value".

As depicted in FIG. 11, among the expected values of MSIs, for example, the tributary slots 6 and 7 (No. 5 and No. 6) are not used. Therefore, in the TS4 search column in the EXP_TS_List (refer to FIG. 12), only 4 and 5, i.e., TS4 and TS5 are registered as tributary slot numbers (TS Number). In each of the TS6 search and TS7 search columns in the EXP_TS_List (refer to FIG. 12), null is registered.

Consequently, 2 is registered as concate information (concatenation information) for which the tributary slot numbers (TS Number) are 4 and 5. Further, null is registered for the concate information (concatenation information) for which the tributary slot numbers (TS Number) are 6 and 7. Other aspects are similar to FIG. 8 to FIG. 10.

(3) Mismatch Detection Procedure

Figure 14:
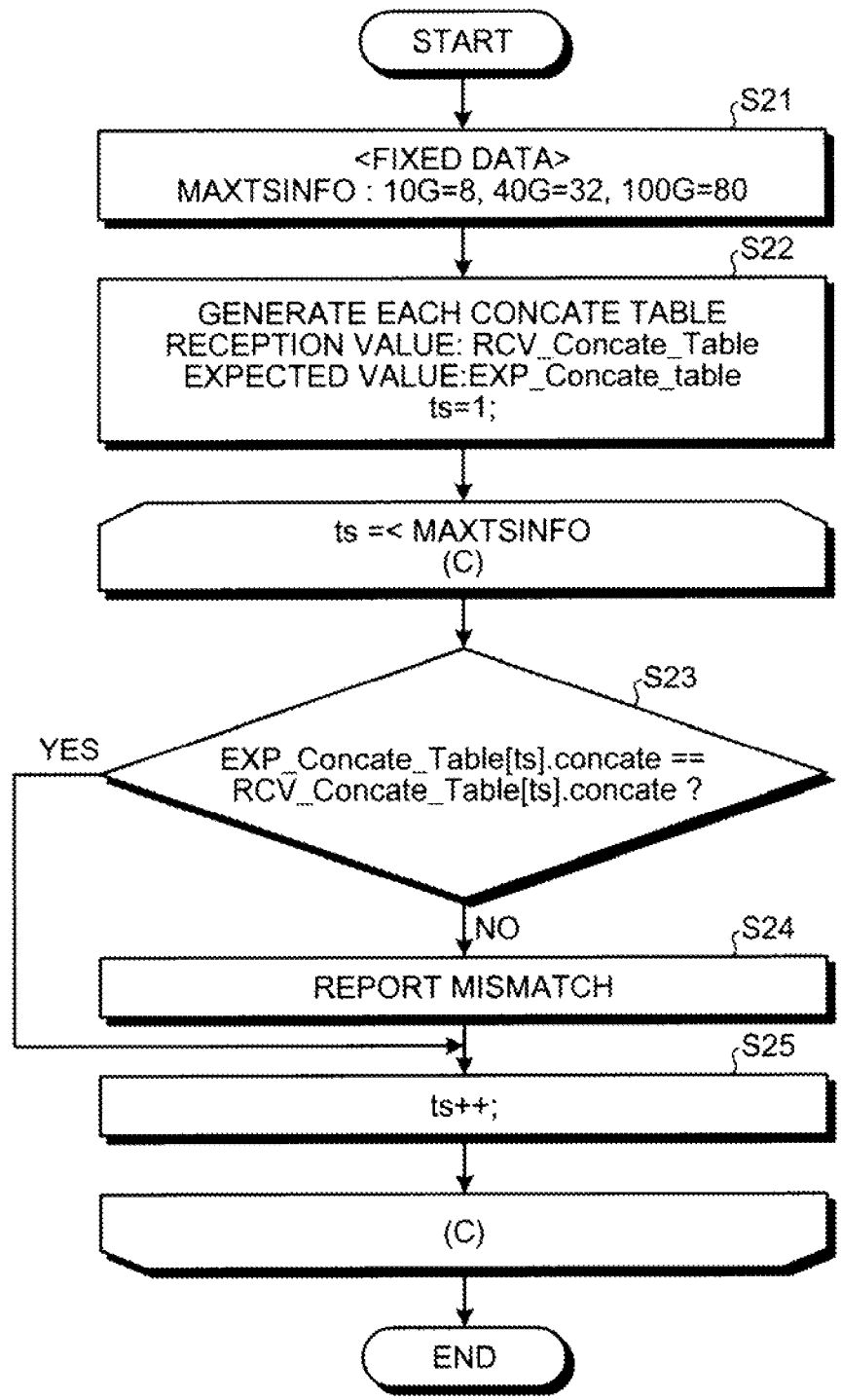
FIG. 14 is a flowchart of a mismatch detection procedure of the optical transmission method according to the second embodiment.

FIG. 14 is a flowchart of a mismatch detection procedure of the optical transmission method according to the second embodiment. As depicted in FIG. 14, when the mismatch detection procedure begins, the MSI processor circuit 28 of the optical transmission apparatus 21 sets, for example, 8 as MAXTSINFO (step S21).

The MSI processor circuit 28 generates the concatenation table of received MSIs (RCV_Concate_Table) and the MSI concatenation table of expected values (EXP_Concate_Table). The generation procedure of each concatenation table is as described in (1) generation procedure of concatenation table of received MSIs and (2) procedure for generating concatenation table of expected values (expected values of MSIs) for tributary slot concatenation counts. Further, the MSI processor circuit 28 initializes the value of ts (step S22). The initial value of ts is 1, for example.

The MSI processor circuit 28 compares the concate information for the same tributary slot number (TS Number) in the RCV_Concate_Table (refer to FIG. 10) and the EXP_Concate_Table (refer to FIG. 13). In other words, the MSI processor circuit 28 determines whether EXP_Concate_Table[ts].concate is equivalent to RCV_Concate_Table[ts].concate (step S23). The concate information for ts=1 is also 1 (step S23: YES) and therefore, the MSI processor circuit 28 does not detect an MSI mismatch alarm. The MSI processor circuit 28 increments the value of ts to 2 (step S25) and returns to step S23.

While the loop processes at step S23 to step S25 (processing loop indicated by (C) in FIG. 14) are repeated, in the example depicted in FIG. 10 and FIG. 13, when the value of ts becomes 4, the concate information does not coincide (step S23: NO). In other words, EXP_Concate_Table[4].concate is 2, while RCV_Concate_Table[4].concate is 4. Therefore, the MSI processor circuit 28 detects an MSI mismatch alarm and reports the mismatch of the tributary port assigned to the tributary slot number (TS Number) 4 (step S24). The MSI processor circuit 28 increments the value of ts to 3 (step S25), and returns to step S23.

The MSI processor circuit 28 repeats the loop processes at step S23 to step S25 until the value of ts becomes greater than MAXTSINFO. The MSI processor circuit 28 reports each mismatch concerning a tributary port assigned to the tributary slot number (TS Number) for which concate information does not coincide (step S24). Subsequently, the MSI processor circuit 28 ends the mismatch detection.

Description of First Modification Example

Figure 15:
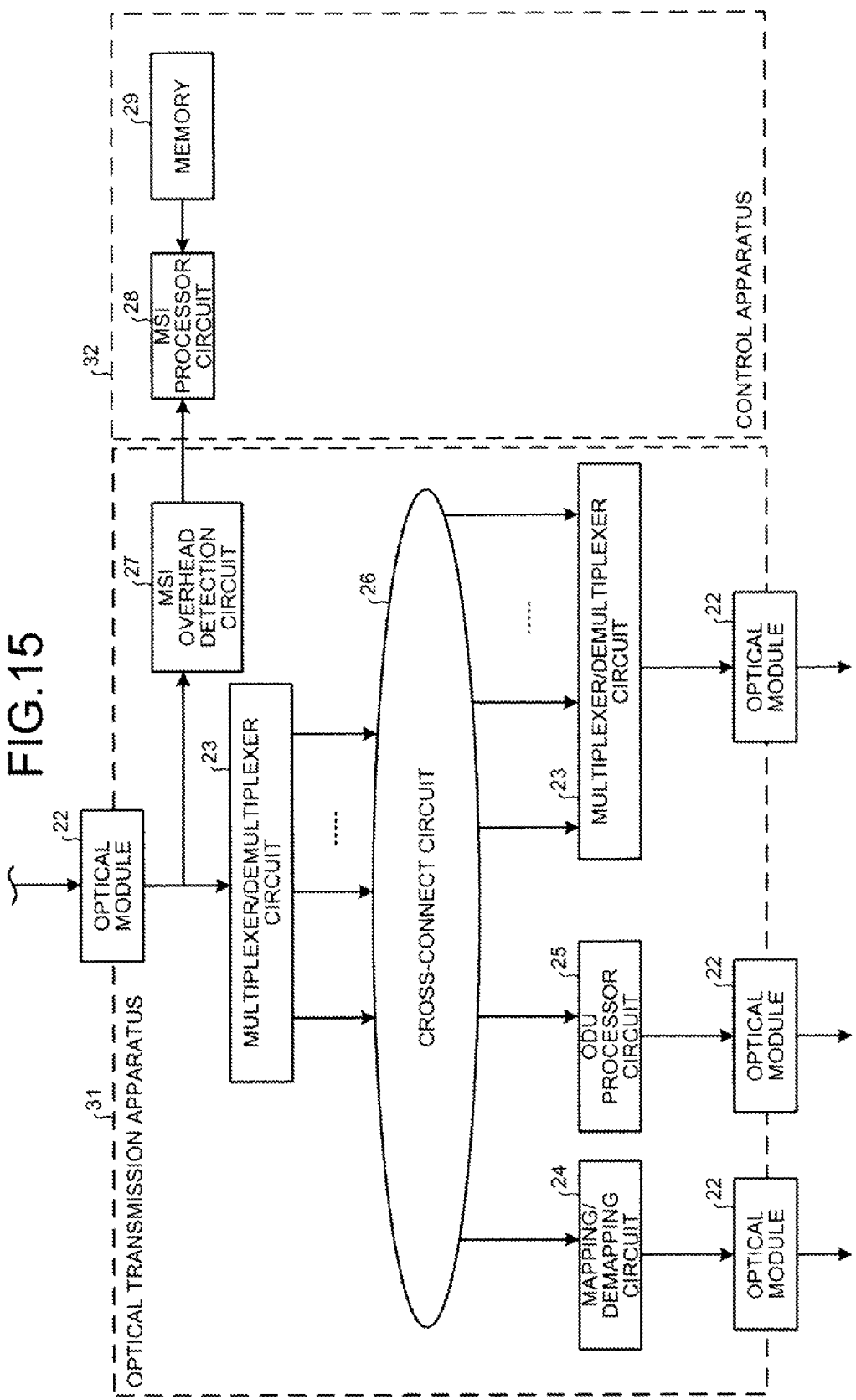
FIG. 15 is a block diagram of a first modification example of the optical transmission apparatus according to the second embodiment.

FIG. 15 is a block diagram of a first modification example of the optical transmission apparatus according to the second embodiment. As depicted in FIG. 15, the optical transmission apparatus may be separated into an optical transmission apparatus 31 and a control apparatus 32. The control apparatus 32 includes the MSI processor circuit 28 and the memory 29. In this case, the optical transmission apparatus 31 does not include the MSI processor circuit 28 or the memory 29.

Description of Second Modification Example

Figure 16:
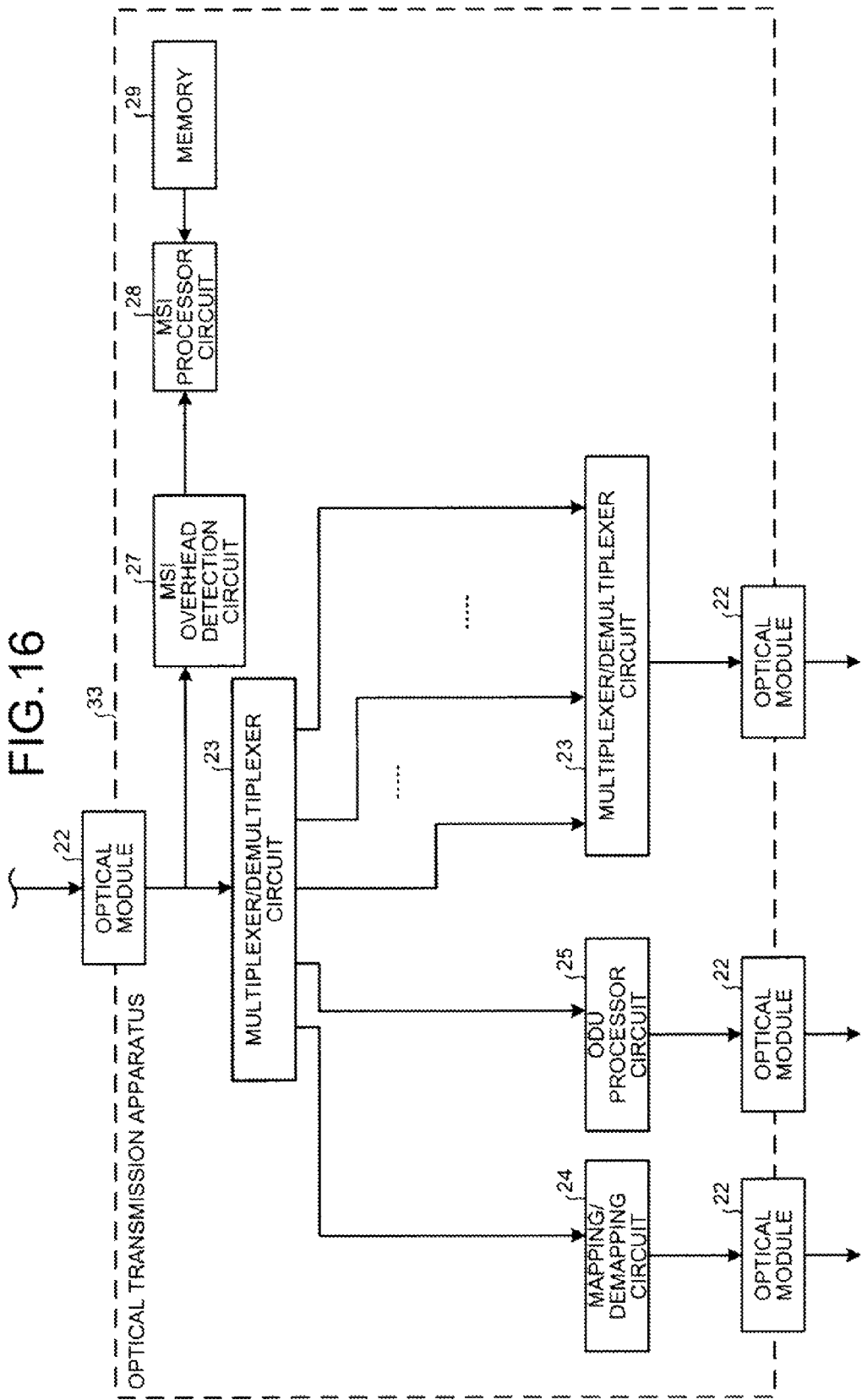
FIG. 16 is a block diagram of a second modification example of the optical transmission apparatus according to the second embodiment.

FIG. 16 is a block diagram of a second modification example of the optical transmission apparatus according to the second embodiment. As depicted in FIG. 16, an optical transmission apparatus 33 may omit the cross connect circuit. In this case, the optical transmission apparatus 33 becomes a multiplexer/demultiplexer apparatus. Alternatively, the optical transmission apparatus 33 may include the cross connect circuit, but the setting of the cross connect circuit may be fixed.

Description of Third Modification Example

Figure 17:
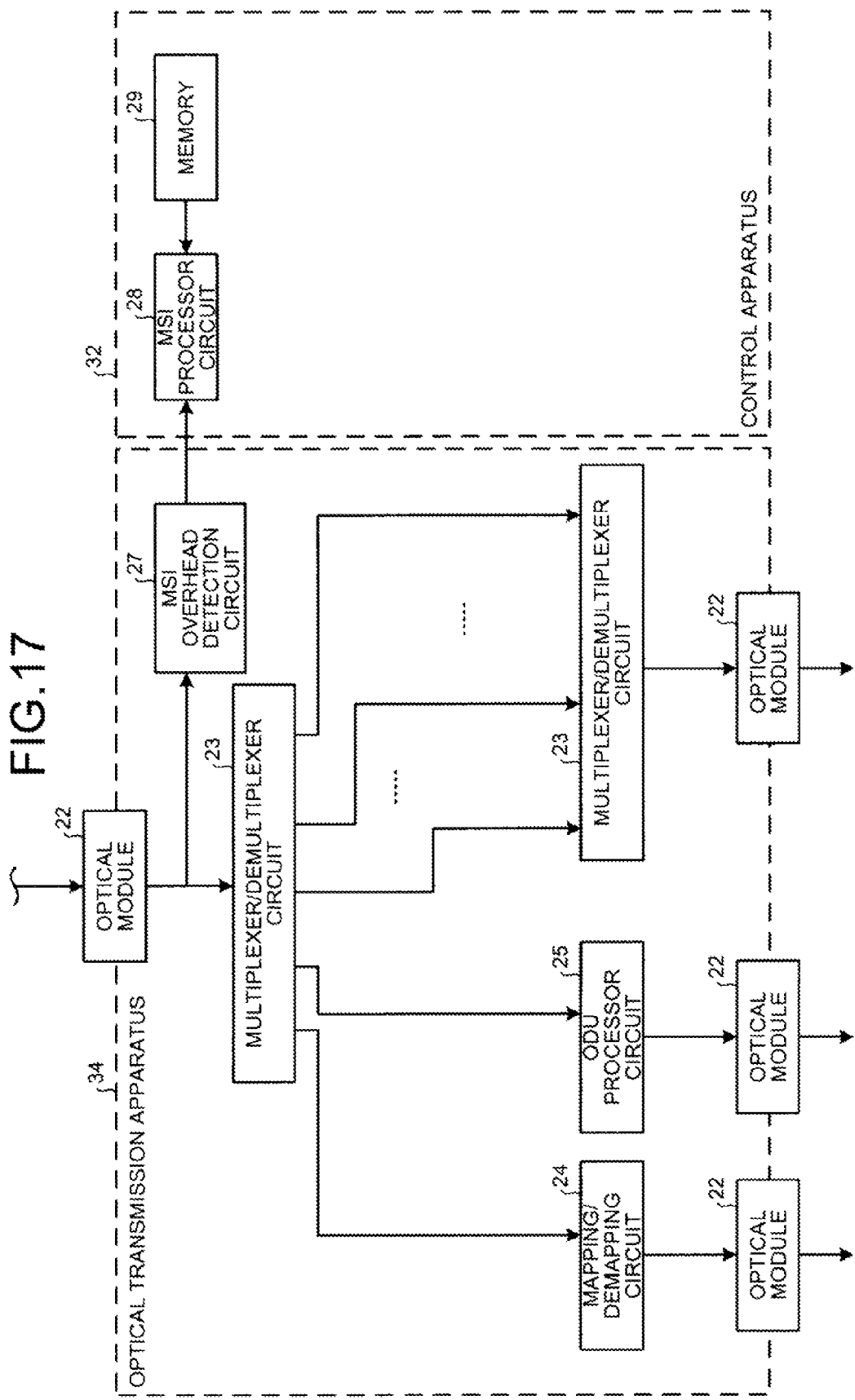
FIG. 17 is a block diagram of a third modification example of the optical transmission apparatus according to the second embodiment

FIG. 17 is a block diagram of a third modification example of the optical transmission apparatus according to the second embodiment. As depicted in FIG. 17, the optical transmission apparatus may be a combination of the first and the second modification examples above and separated into an optical transmission apparatus 34 and the control apparatus 32. The optical transmission apparatus 34 does not include the MSI processor circuit 28 or the memory 29. The optical transmission apparatus 34 may omit the cross connect circuit or may fix the setting of the cross connect circuit.

According to the second embodiment, effects similar to those of the first embodiment can be obtained. Further, the concatenation count of tributary slots allocated the same tributary port need not be newly defined as overhead information and therefore, the configuration of the circuit processing frames need not be modified.

Third Embodiment

Figure 18:
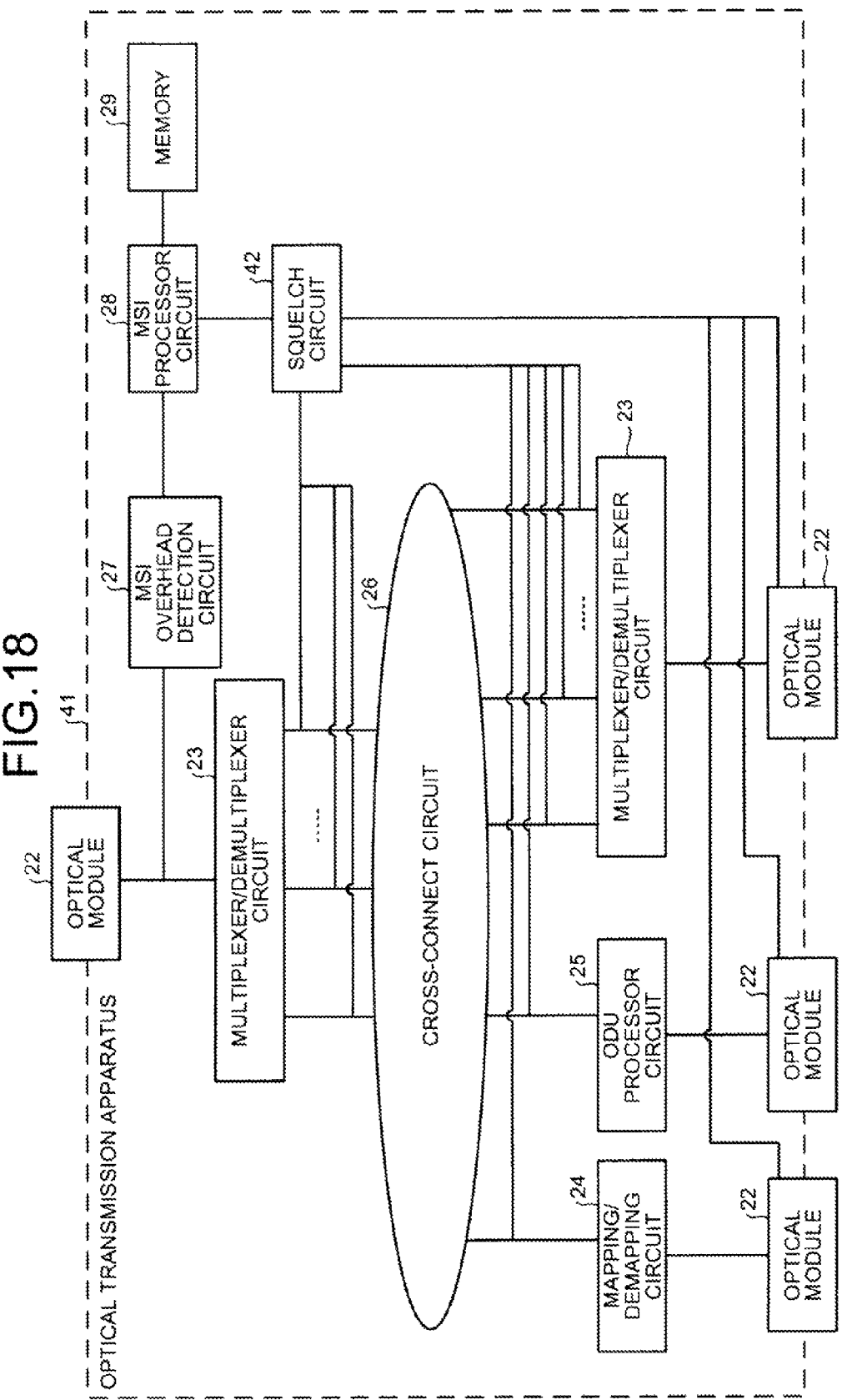
FIG. 18 is a block diagram of the optical transmission apparatus according to a third embodiment.
Figure 19:
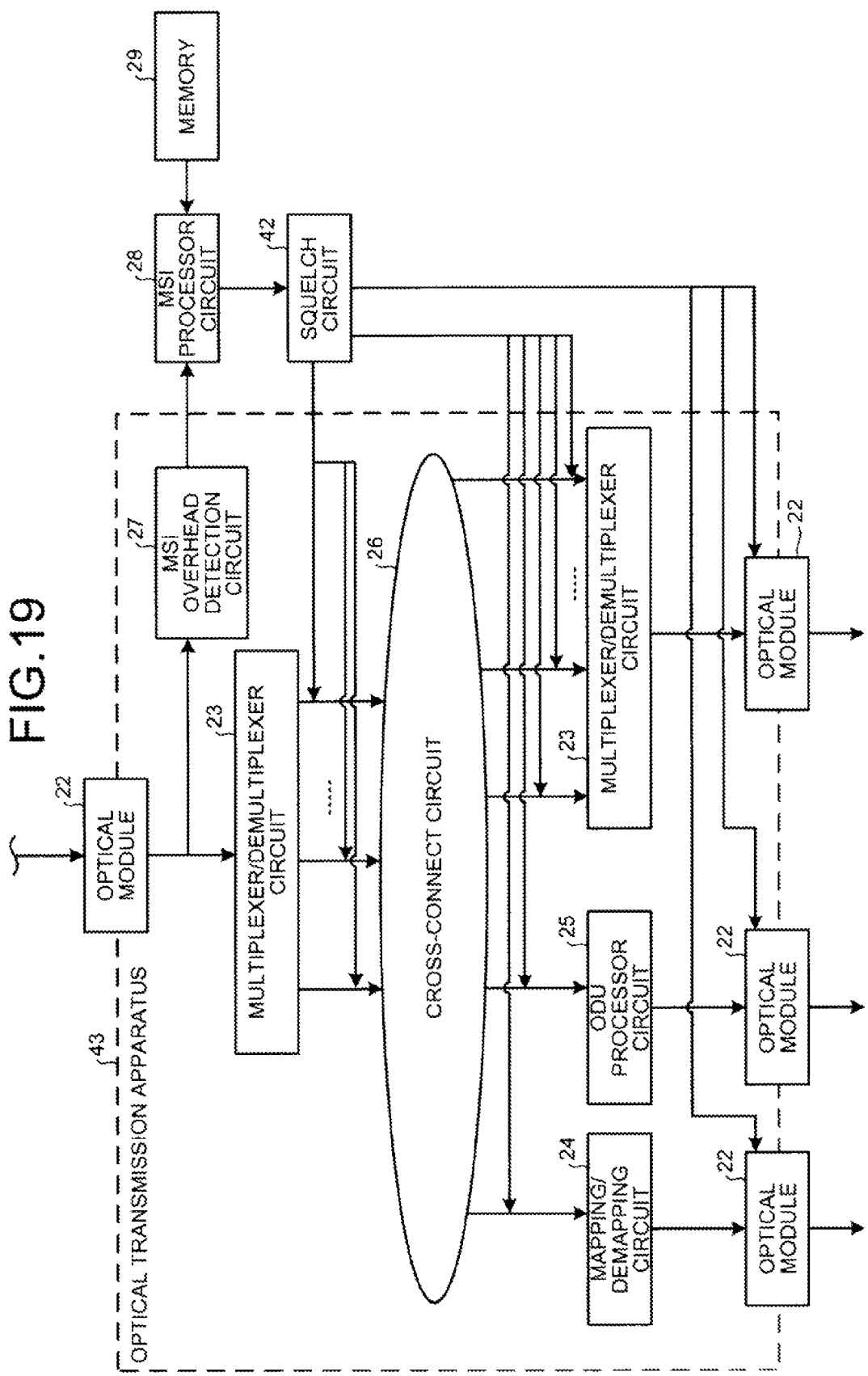
FIG. 19 is a block diagram of the signal flow of the optical transmission apparatus according to the third embodiment.

FIG. 18 is a block diagram of the optical transmission apparatus according to a third embodiment. FIG. 19 is a block diagram of the signal flow of the optical transmission apparatus according to the third embodiment. As depicted in FIG. 18 and FIG. 19, an optical transmission apparatus 41 may include a squelch circuit 42 as a converter or a terminator, for example. The squelch circuit 42 is connected to the MSI processor circuit 28. When the MSI processor circuit 28 detects an MSI mismatch alarm, the squelch circuit 42 blocks the signal of the LO-ODUk frame that the mismatch alarm concerns.

For example, the squelch circuit 42 may perform signal conversion such as ODUk-alarm indication signal (AIS) in an OTN, AIS-L in SONET, or LF in a 10-Gbps Ethernet (registered trade name), upstream to the cross connect circuit 26 and according to the client signal type. The squelch circuit 42 may performs such signal conversion downstream from the cross connect circuit 26.

Alternatively, the squelch circuit 42 may terminate optical output to the optical module 22, which again outputs to the network, a client signal allocated to a tributary port that a mismatch alarm concerns or an OTN frame accommodating the client signal. In the example depicted in FIG. 18, although the squelch circuit 42 is depicted to perform signal conversion upstream and downstream from the cross connect circuit 26 as well as termination of the optical output to the optical module 22, configuration may be such that the squelch circuit 42 performs any one, two, or all of the processes.

Description of First Modification Example

Figure 20:
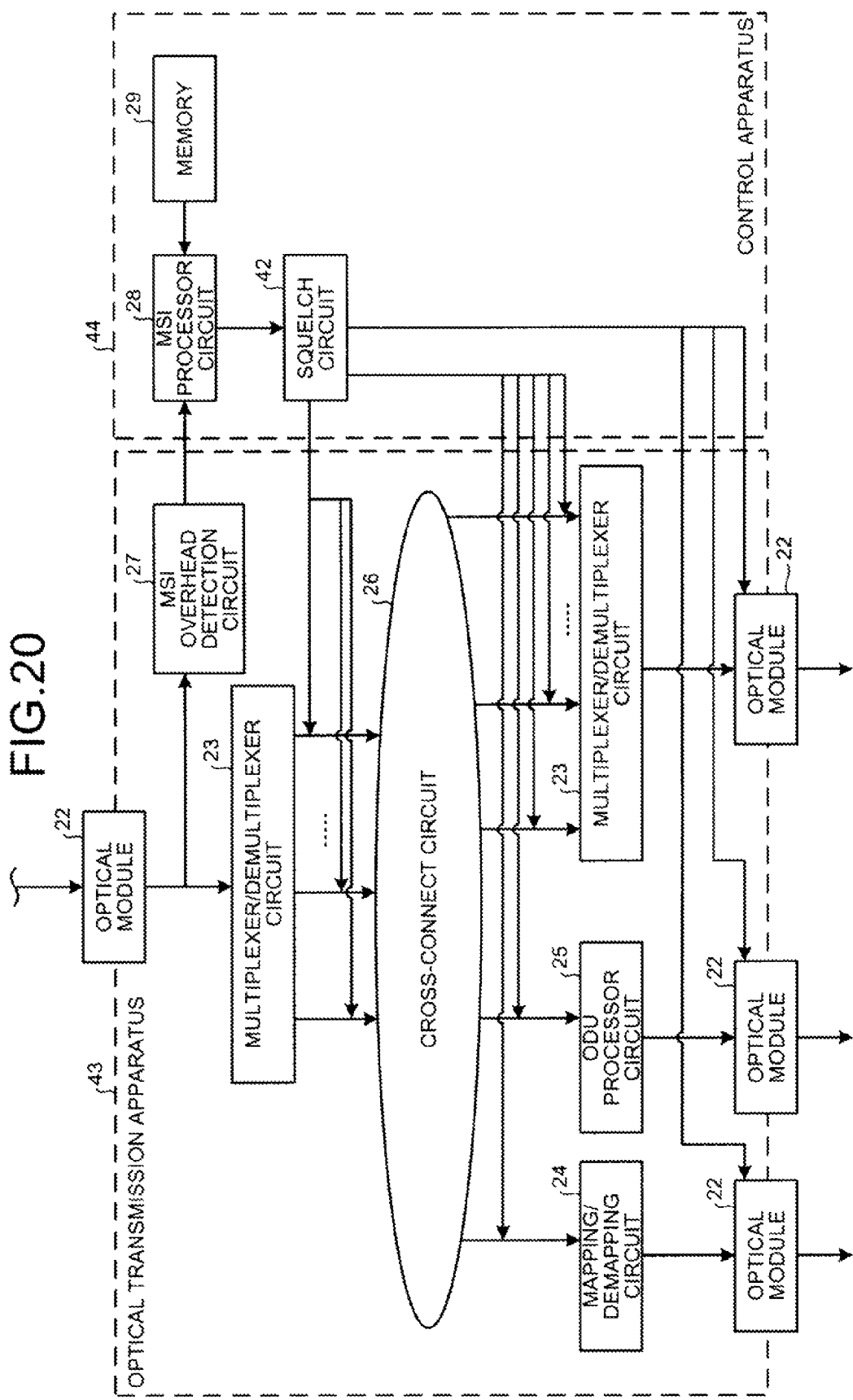
FIG. 20 is a block diagram of a first modification example of the optical transmission apparatus according to the third embodiment.

FIG. 20 is a block diagram of a first modification example of the optical transmission apparatus according to the third embodiment. As depicted in FIG. 20, similar to the first modification example of the optical transmission apparatus according to the second embodiment, the optical transmission apparatus may be separated into an optical transmission apparatus 43 and a control apparatus 44. The control apparatus 44 includes the MSI processor circuit 28, the memory 29, and the squelch circuit 42. In this case, the optical transmission apparatus 43 does not include the MSI processor circuit 28, the memory 29, or the squelch circuit 42.

Description of Second Modification Example

Figure 21:
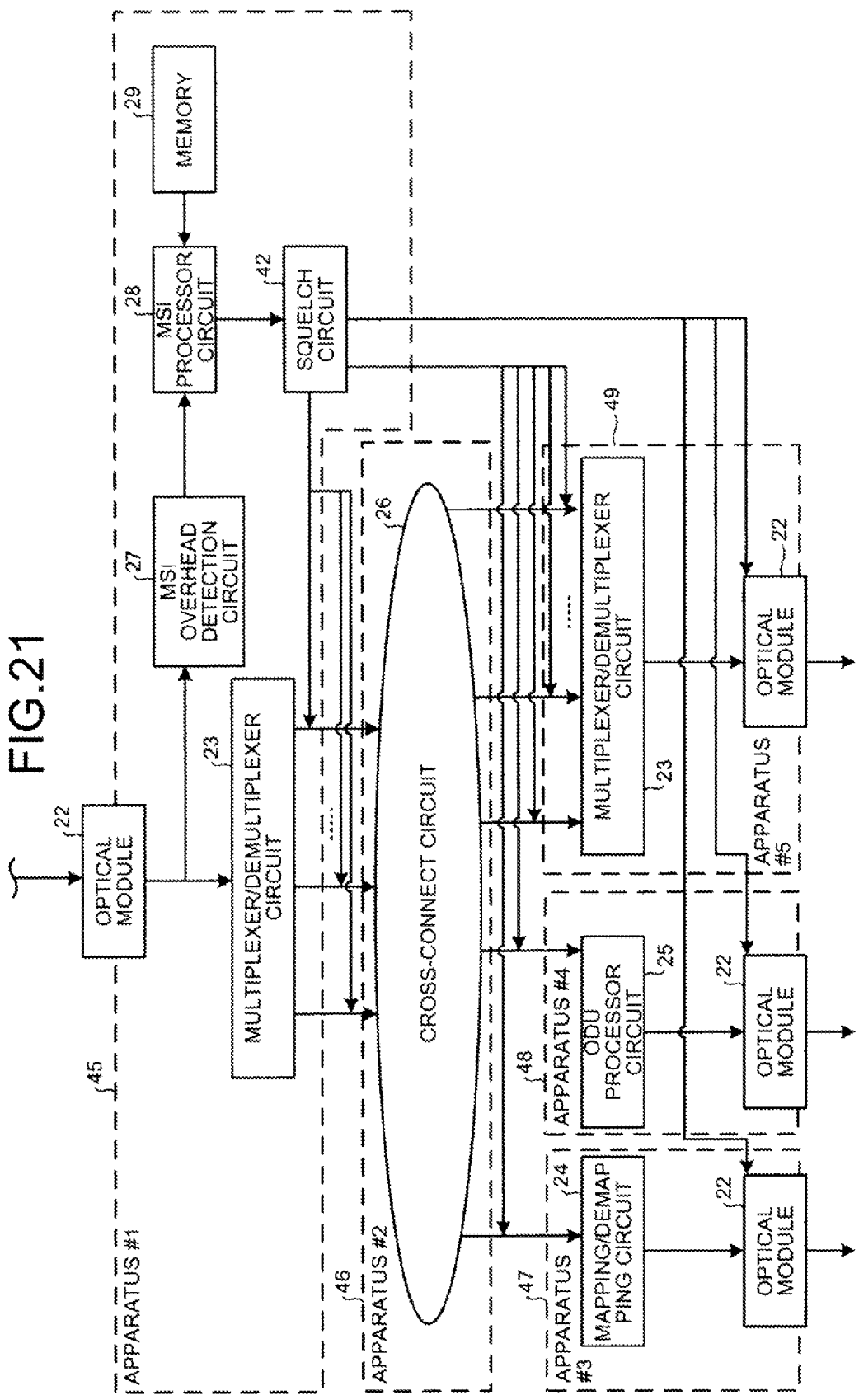
FIG. 21 is a block diagram of a second modification example of the optical transmission apparatus according to the third embodiment.

FIG. 21 is a block diagram of a second modification example of the optical transmission apparatus according to the third embodiment. As depicted in FIG. 21, the optical transmission apparatus may be separated into an apparatus #2_46 that includes the cross connect circuit 26, and an apparatus #1_45, an apparatus #3_47, an apparatus #4_48, and an apparatus #5_49 that respectively form an interface with the network. In the example depicted in FIG. 21, the MSI overhead detection circuit 27, the MSI processor circuit 28, the memory 29, and the squelch circuit 42 may be included in an apparatus #1_45.

Description of Third Modification Example

Figure 22:
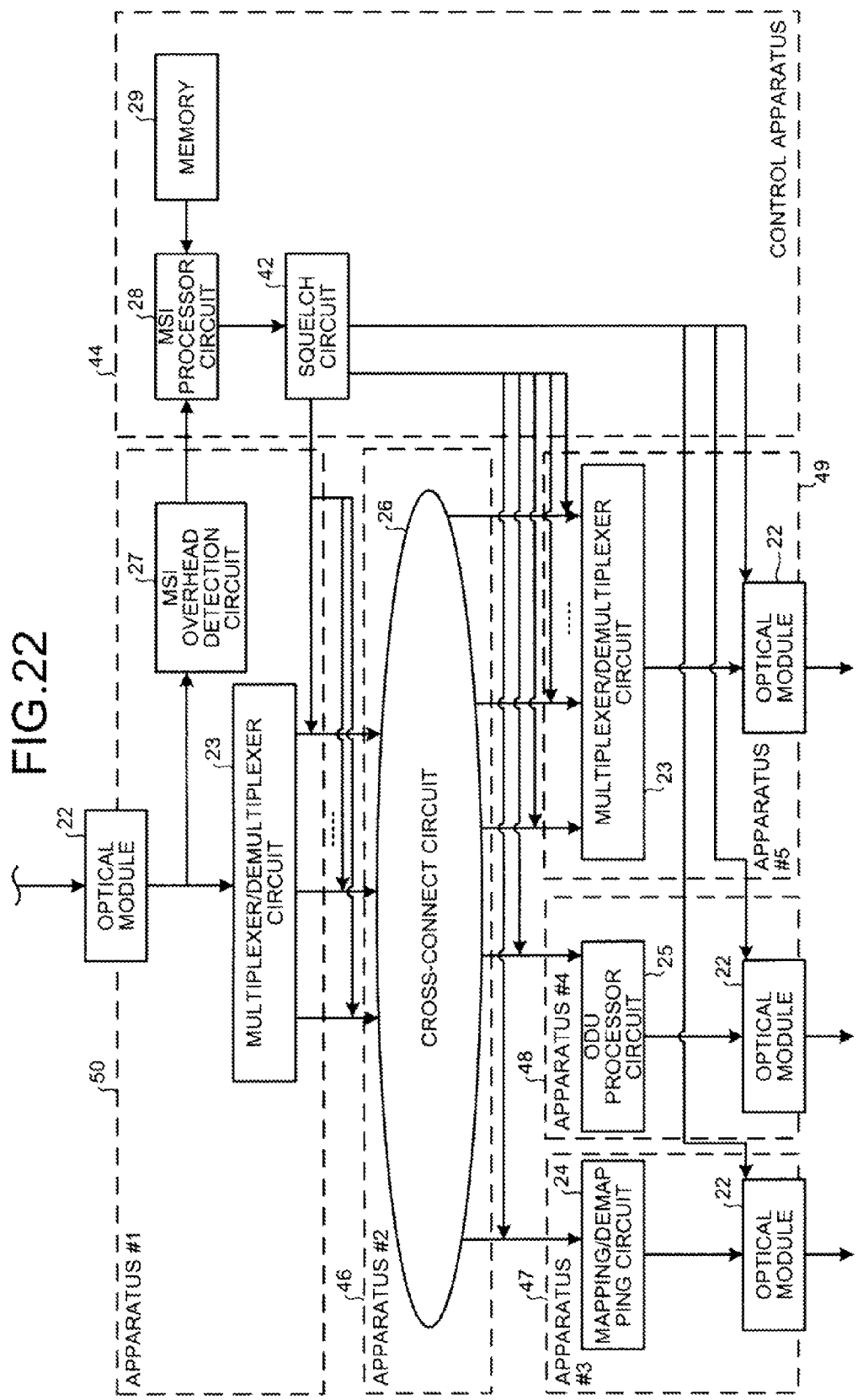
FIG. 22 is a block diagram of a third modification example of the optical transmission apparatus according to the third embodiment.

FIG. 22 is a block diagram of a third modification example of the optical transmission apparatus according to the third embodiment. As depicted in FIG. 22, the optical transmission apparatus may be a combination of the first modification example and the second modification example according to the third embodiment, where the optical transmission apparatus is separated into an optical transmission apparatus 50 and the control apparatus 44. The optical transmission apparatus 50 does not include the MSI processor circuit 28, the memory 29, or the squelch circuit 42.

Description of Fourth Modification Example

Figure 23:
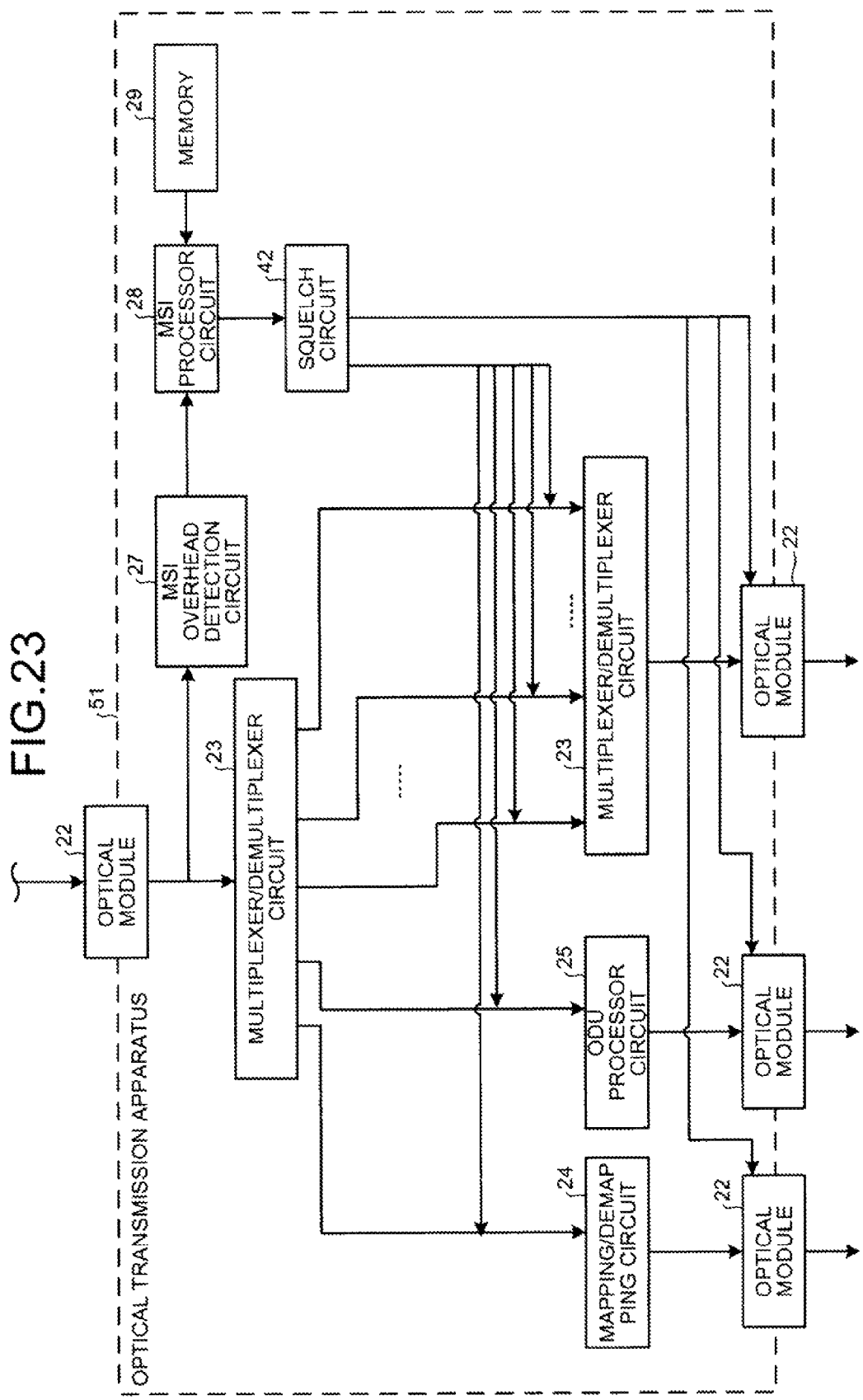
FIG. 23 is a block diagram of a fourth modification example of the optical transmission apparatus according to the third embodiment.

FIG. 23 is a block diagram of a fourth modification example of the optical transmission apparatus according to the third embodiment. As depicted in FIG. 23, similar to the second modification example of the optical transmission apparatus according to the second embodiment, an optical transmission apparatus 51 may be a multiplexer/demultiplexer that does not include a cross connect circuit or has a cross connect circuit whose settings are fixed.

Description of Fifth Modification Example

FIG. 24 is a block diagram of a first modification example of the optical transmission apparatus according to the third embodiment. As depicted in FIG. 24, the optical transmission apparatus may be a combination of the first modification example and the fourth modification example of the optical transmission apparatus according to the third embodiment, where the optical transmission apparatus is separated into an optical transmission apparatus 52 and the control apparatus 44. The optical transmission apparatus 52 does not include the MSI processor circuit 28, the memory 29, or the squelch circuit 42. The optical transmission apparatus 52 may be configured to not include a cross connect circuit or to include a cross connect circuit whose settings are fixed.

According to the third embodiment, effects similar to those of the second embodiment can be achieved. Further, the squelch circuit 42 can prevent re-output of a client signal allocated to a tributary port that a mismatch alarm concerns or an OTN frame accommodating the client signal, to the network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission apparatus comprising:
    an extractor that extracts information indicating port allocation to each slot of a reception signal;
    a comparator that based on the extracted information and for a given slot among the slots, obtains a count of the slots allocated the same port as the given slot and compares the obtained count of slots and an expected value for the given slot; and
    a memory that stores therein for each slot, an expected value for the count of slots allocated the same port as the slot, wherein
    the comparator detects a mismatch concerning the given slot, when the obtained count of slots and the expected value for the given slot differ.

2. The optical transmission apparatus according to claim 1 and further comprising
    a converter that when a mismatch is detected, converts to another signal, a signal that is separated from the reception signal and of a slot for which the obtained count of slots and the expected value differ.

3. The optical transmission apparatus according to claim 1 and further comprising
    a converter that when a mismatch is detected, converts to another signal, a signal that is separated from the reception signal, distributed to an output destination and of a slot for which the obtained count of slots and the expected value differ.

4. The optical transmission apparatus according to claim 1 and further comprising
    a terminator that when a mismatch is detected, terminates output of a signal to an output unit that outputs the signal, the signal being separated from the reception signal, distributed to an output destination and of a slot for which the obtained count of slots and the expected value differ.

5. The optical transmission apparatus according to claim 1 and further comprising
    a cross connect that distributes to respective output destinations, signals of each slot and separated from the reception signal.

6. An optical transmission method comprising:
    extracting information indicating port allocation to each slot of a reception signal;
    comparing an expected value for a given slot among the slots and a count of the slots allocated the same port as the given slot, the count of slots being obtained based on the extracted information; and
    detecting a mismatch when the count of slots and the expected value differ, the detecting being performed for each slot.

7. The optical transmission method according to claim 6 and further comprising
    converting to another signal and when a mismatch is detected, a signal that is separated from the reception signal and of a slot for which the count of slots and the expected value differ.

8. The optical transmission method according to claim 6 and further comprising
    converting to another signal and when a mismatch is detected, a signal that is separated from the reception signal, distributed to an output destination and of a slot for which the count of slots and the expected value differ.

9. The optical transmission method according to claim 6 and further comprising
    terminating, when a mismatch is detected, output of a signal that is separated from the reception signal, distributed to an output destination and of a slot for which the count of slots and the expected value differ.

* * * * *